United States Patent
Sudo et al.

(10) Patent No.: US 7,197,455 B1
(45) Date of Patent: Mar. 27, 2007

(54) CONTENT SELECTION SYSTEM

(75) Inventors: Fukuharu Sudo, Tokyo (JP); Makoto Akabane, Tokyo (JP); Toshitada Doi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/674,576

(22) PCT Filed: Mar. 3, 2000

(86) PCT No.: PCT/JP00/01304

§ 371 (c)(1),
(2), (4) Date: Nov. 1, 2000

(87) PCT Pub. No.: WO00/52913

PCT Pub. Date: Sep. 8, 2000

(30) Foreign Application Priority Data

Mar. 3, 1999 (JP) .................................. 11-056107

(51) Int. Cl.
*G10L 15/00* (2006.01)
(52) U.S. Cl. .................. 704/231; 704/270; 704/270.1; 704/276; 709/203; 707/103; 105/1
(58) Field of Classification Search ................ 704/231, 704/270, 270.1; 707/103 R; 705/1; 379/88.03, 379/88.04
See application file for complete search history.

(56) References Cited

U.S. PATENT DOCUMENTS

| 5,732,216 | A | * | 3/1998 | Logan et al. ................ 709/203 |
| 5,899,975 | A | * | 5/1999 | Nielsen .................... 704/270.1 |
| 5,915,001 | A | * | 6/1999 | Uppaluru .................. 379/88.22 |
| 5,999,940 | A | * | 12/1999 | Ranger .................... 707/103 R |
| 6,108,640 | A | * | 8/2000 | Slotznick ..................... 705/26 |
| 6,167,117 | A | * | 12/2000 | Will ........................ 379/88.03 |
| 6,185,535 | B1 | * | 2/2001 | Hedin et al. ................ 704/270 |
| 6,240,405 | B1 | * | 5/2001 | Suzuki ........................ 706/45 |
| 6,263,313 | B1 | * | 7/2001 | Milsted et al. ................. 705/1 |
| 6,282,512 | B1 | * | 8/2001 | Hemphill ................. 704/270.1 |
| 6,493,671 | B1 | * | 12/2002 | Ladd et al. .................. 704/270 |
| 6,707,889 | B1 | * | 3/2004 | Saylor et al. ............ 379/88.04 |
| 2002/0072915 | A1 | * | 6/2002 | Bower ..................... 704/270.1 |
| 2002/0097984 | A1 | * | 7/2002 | Abecassis .................... 386/70 |

FOREIGN PATENT DOCUMENTS

| JP | 6-133039 | 5/1994 |
| JP | 8-314950 | 11/1996 |
| JP | 9-326887 | 12/1997 |

* cited by examiner

*Primary Examiner*—Richemond Dorvil
*Assistant Examiner*—Qi Han
(74) *Attorney, Agent, or Firm*—Finnegan, Henderson, Farabow, Garrett & Dunner L.L.P.

(57) ABSTRACT

A client 2 includes a transmission unit 2d for transmitting the input speech information over a network to a server system 3 and an output unit 2b for receiving the contents selection information from the server system 3 over the network to output the received information. The server system 3 includes a prepared information storage unit 9b for memorizing one or more pieces of the preparation information pertinent to each contents, from one contents to another, and an information preparing server 7 for preparing the contents selection information based on the speech information received from the client 2 over the network and on the preparation information to send the so-prepared contents selection information to the client 3 over the network.

19 Claims, 4 Drawing Sheets

CONTENT SELECTION SYSTEM

TECHNICAL FIELD

This invention relates to a contents selection system, a contents selecting client, a contents selection server and a contents selecting method, in which an operator is permitted to select which contents he or she desires to acquire from a list of contents comprised of plural items received from a server over a network and which is output by the client, by the client inputting the speech information to a microphone or the like.

BACKGROUND ART

Recently, portable terminals, such as portable telephone, in which emphasis is placed on portability, are in widespread use, such that, for improving portability, reduction in size and weight of the portable terminal has become a desideratum. In order to improve the portability in the portable terminal, an input device, such as a keyboard, has to be reduced in size or eliminated. So, in the portable terminal, a speech recognition device, which is less bulky than the conventional input device, is stirring up notice. That is, with the use of such speech recognition device, not only can the terminal itself be reduced in size, but also the terminal can be used by a user with improved facility.

On the other hand, in the contents selection system, constructed between the server and the client, development of the digital signal processing technique in the technique of compressing data, such as speech, or in the field of broadcasting/communication, has led to realization of the service of furnishing the audio information, such as the so-called music-on-demand, referred to below as MOD.

However, if a speech recognition device is used in the portable terminal as means for recognizing the input information, it is extremely difficult to eliminate errors in speech recognition. Moreover, the probability of accurate recognition of the input audio information in the conventional speech recognition device is not that high.

Moreover, if, in the MOD service, the speech recognition device has made mistaken recognition of the speech information input for designating the music desired to be furnished, the user has to input the same speech information to the speech recognition device. In addition, since the speech recognition device cannot necessarily make correct recognition of the speech the user inputs next, the user has to input the same speech information repeatedly to the speech recognition device, thus seriously inconveniencing the user.

Moreover, if the user has specified the music etc desired to be furnished by inputting several pieces of the speech information to the speech recognition device, it may be an occurrence that plural music numbers etc are meeting with the conditions of the input speech information. In such case, it is extremely difficult to specify the music which the user desires to be furnished.

DISCLOSURE OF THE INVENTION

In view of the above-described status of the art, it is an object of the present invention to provide a contents selection system, a contents selecting client, a contents selection server and a contents selecting method, in which an operator is permitted to select which contents he or she desires to acquire from a list of contents comprised of plural items received from a server over a network and output by the client, by the client inputting the speech information to a microphone or the like.

The present invention provides a contents selection system in which a server transmits the contents selection information for having a client select the contents through a network, wherein the client has input information transmitting means for transmitting the input speech information through the network to the server and outputting means for receiving the contents selection information from the server through the network and for outputting the received contents selection information. The server includes prepared information storage means for storing one or more pieces of the preparation information pertinent to each contents, from one contents to another, contents selection information preparation means for preparing the contents selection information based on the speech information received from the client through the network and on the preparation information and contents selection information transmitting means for transmitting the contents selection information prepared by the contents selection information preparation means to the client over the network.

In this contents selection system, the client transmits the input speech information over the network to the server, which then prepares the contents selection information based on the speech information and the preparation information received from the client over the network and transmits the so-prepared contents selection information to the client over the network.

The present invention also provides a contents selection client for outputting the contents selection information for selecting contents transmitted from a server over a network, wherein the contents selection client includes input information transmitting means for transmitting the input speech information over the network to the server and outputting means for receiving the contents selection information from the server over the network to output the received contents selection information.

In this contents selection client, the input speech information is sent over the network to the server, while the contents selection information is received from the server over the network and issued as output.

The present invention also provides a contents selection server including prepared information storage means for memorizing one or more pieces of the information on each contents, from one contents to another, contents selection information preparation means for preparing the contents selection information for selecting the contents based on the speech information received from a client over a network and the preparation information and contents selection information transmitting means for transmitting the contents selection information prepared by the contents selection information preparation means to the client over the network.

In this contents selection serer, one or more pieces of the preparation information pertinent to each contents is stored from one contents to another. The contents selection information for selecting the contents is prepared on the basis of the speech information and the preparation information received over the network from the client. The so-prepared contents selection information is transmitted over the network to the client.

The present invention further provides a method for selecting contents wherein a server memorizes one or more pieces of the preparation information on each contents, from one contents to another, a client transmits the input speech information over a network to the server, the server prepares the contents selection information for selecting the contents, based on the speech information received from the client over the network and on the preparation information, and transmits the so-prepared contents selection information to the network over the network, and wherein the client receives the contents selection information over the network from the server and outputs the contents selection request information the client requests to select based on the contents selection information.

In this contents selection method, the client transmits the input speech information over the network to the server. Based on the speech information and the preparation information, received over the network from the client, the server prepares the contents selection information, received from the client over the network, and transmits the so-prepared contents selection information over the network to the client. The client receives the contents selection information from the server over the network and outputs the contents selection request information which requests selection in accordance with the contents selection information.

BEST MODE FOR CARRYING OUT THE INVENTION

Figure 1:
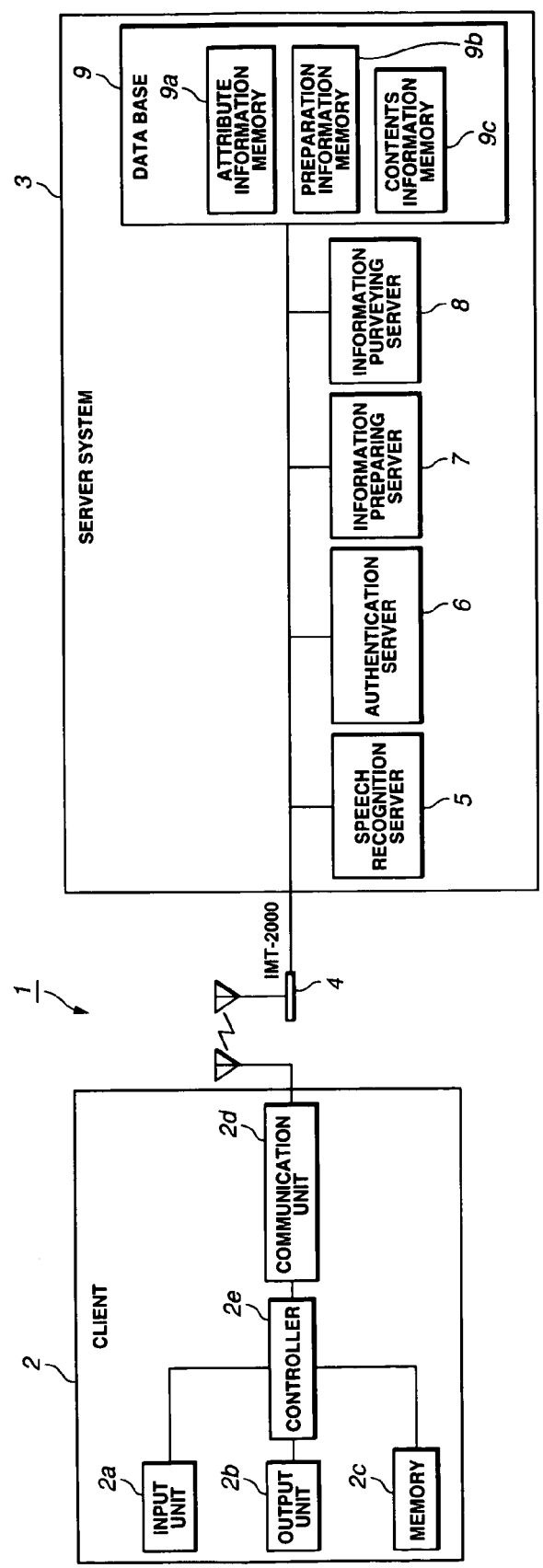
FIG. 1 is a block diagram showing a contents selection system according to an embodiment of the present invention.

Referring to the drawings, the best mode for carrying out the present invention is explained in detail.

The present invention is applied to a contents selection system configured as shown for example in FIG. 1.

This contents selection system is used in an information furnishing service for exploiting the so-called music-on-demand (MOD) service in a network employing e.g., the International Multimedia telecommunications-2000, referred to below as IMT-2000. Meanwhile, the IMT-2000 means a communication system which the International Telecommunication Union (ITU) adopts for digital portable telephone for the twenty-first century.

Referring to FIG. 1, the contents selection system 1 includes a client 2, as the Personal Digital Assistant, referred to below as PDA, a server system 3, provided with a variety of servers, and a public base station 4, as a radio equipment in charge of doing setting of a radio network between the client 2 and the server system 3 and control through e.g., the IMT-2000, referred to below as the base station.

The client 2 includes an input unit 2a, processing e.g., the speech information input by a user, an output unit 2b for outputting e.g., the contents and the information for selecting the contents, a storage unit for clients 2c, for storing e.g., the contents selection information received from the server system 3, a communication unit 2d in charge of connection processing for establishing the connection to the server system 3 and communication processing in meeting with the communication system used by the client 2, and a controller 2e for controlling the functions of various processing units of the input unit 2a, output unit 2b, storage unit for clients 2c and the communication unit 2d.

The contents selection information means e.g., a list stating, from item to item, the information pertinent to several contents as candidates for transmission from the server system 3 to he client 2.

The input unit 2a includes a speech inputting unit, such as a microphone. The microphone of this input unit 2a furnishes the user-input speech information to the controller 2e, in order that the contents, as the music information the user is desirous to hear, will be transmitted from the server system 3. These contents are referred to below as music contents. Meanwhile, the input unit 2a may be constructed by e.g., an input device other than the speech inputting device, such as a keyboard or a jog dial.

The output unit 2b is constituted by e.g., a speech outputting unit, such as a speaker. The speaker of this output unit 2b reproduces the music contents, transmitted from e.g., the server system 3 through the communication unit 2d and the controller 2e. The communication unit 2d and the controller 2e will be explained subsequently.

The output unit 2b may also be constructed by e.g., a display device, such as a liquid crystal display. The output unit 2b may also output the contents, such as music contents, received from the server system 3, to the external terminal, by being provided with a digital output terminal, such as terminal of The Institute of Electrical and Electronics Engineers 1394, referred to below as the IEEE 1394. The output unit 2b may also output the information ancillary to contents, such as music contents, received from the server system 3, on e.g., a liquid crystal display, during the time of reproduction of these contents.

The storage unit for clients 2c is made up of a storage device that can be dismounted from the client 2, such as a memory card, mini-disc, referred to below as MD, a digital audio tape recorder, referred to below as DAT, or a storage device that cannot be dismounted from the client 2, such as a flash memory or a hard disc. This storage unit for clients 2c stores the contents information, such as music contents or a list of the musical contents, sent from the server system 3 through the communication unit 2d and the controller 2e. The storage unit for clients 2c also memorizes a private user ID, owned by each client 2, such as a user ID for IMT-2000, and transmits this USER ID to the server system 3 through the controller 2e and the communication unit 2d, based on the control signal from the controller 2e.

The communication unit 2d is made up e.g., of a baseband portion and a radio frequency (RF) portion. This communication unit 2d transmits the input speech information, furnished from the controller 2e, to the server system 3, while receiving the contents selection information from the server system 3 to furnish the received contents selection information etc to the controller 2e.

The controller 2e is made up e.g., of a CPU. This controller 2e includes a control program for receiving e.g., the contents selection information from the server system 3 through the base station 4 and controls the output unit 2b, communication unit 2d and the storage unit for clients 2c on executing the control program. Meanwhile, the controller 2e is connected to the input unit 2a and performs controls in the control program based on e.g., the speech information fed from the input unit 2a.

The server system 3 includes a speech recognition server 5 for performing speech recognition on the input speech information received from the client 2, an authentication server 6 for performing e.g., the connection authentication processing with respect to the client 2 based on the input speech information recognized by the speech recognition server 5, and a server for preparing the contents selection information 7 for preparing the contents selection information based on the input speech information recognized by the speech recognition server 5 and the preparation information as later explained. The server for preparing the contents selection information 7 is referred to below as the information preparation server. The server system 3 also includes an information purveying server 8 for transmitting to the client 2 the contents selected by the user based on the contents selection information, and a database 9 for memorizing the contents transmitted to the client 2.

When the information received through the base station 4 from the communication unit 2d of the client 2 is the speech information, the speech recognition server 5 performs speech recognition on the received speech information by an acoustic analyzer, not shown, an acoustic model and a language model. The speech recognition server 5 furnishes the speech information, which is the result of the speech recognition (recognized speech information), to the authentication server 6 or to the selection server 7, which will be explained subsequently. Meanwhile, the speech recognition server 5 may transmit the recognized speech information to the client 2 in order to have the user confirm whether or not the result of the speech recognition is accurate.

The acoustic analysis unit means a processor for extracting a sequence of acoustic characteristic quantities from the input speech information. The acoustic model means the information for evaluating the similarity between the speech and the pattern of part or all of the sequence of acoustic characteristic quantities, using an evaluation equation for evaluating the acoustic similarity with respect to the acoustic characteristic quantities extracted by this acoustic analyzer. The language model is the information for giving the constraint on the connection to the acoustic model.

The authentication server 6 performs authentication processing for the client 2, using e.g., the Remote Authentication Dial In User Services (RADIUS), based on e.g., the recognized speech information furnished from the speech recognition server 5. The authentication server 6 performs connection processing from the client 2, using e.g., the Point to Point Protocol (PPP), based on e.g., the recognized speech information furnished from the speech recognition server 5.

The RADIUS means a dial-up connection user authentication system for a dial-in for connection to the network access server having a modem for dial-in. The PPP means a protocol for connection to the Internet over e.g., the public telephone network.

The information preparing server 7 prepares the contents selection information based on the recognized speech information furnished from the speech recognition server 5 and on the preparation information acquired from a prepared information storage unit 9b of the database 9 as later explained. That is, the information preparing server 7 prepares the contents selection information by employing several preparation methods from preparation methods for the contents selection information which will be explained subsequently. The information preparing server 7 transmits the prepared contents selection information to the client 2 to have the user select the contents he or she desires to be furnished from the server system 3.

The information purveying server 8 receives, from the client 2, the information pertinent to e.g., the music contents selected by the user based on the contents selection information he or she received from the information preparing server 7, to acquire e.g., the music contents for transmission to the client 2 from a contents information storage unit 9c to send the music contents so acquired to the client 2, The database 9 includes an attribute information storage unit 9a for memorizing the attribute information, such as user ID or password, a prepared information storage unit 9b for memorizing one or more pieces of the preparing information pertinent to respective contents, from contents to contents, and a contents information storage unit 9c for storing the contents for transmission to the client 2.

Meanwhile, the respective servers of the server system 3 may be the same server.

In the above-described contents selection system 1, the server system 3 receives e.g., the input speech information for preparing the contents selection information from the client 2, performs speech recognition based on the input speech information, and prepares the contents selection information based on the recognized speech information, as the input speech information, processed with speech recognition, and the preparing information, to transmit the contents selection information, so prepared, to the client 2. The client 2 allows the user to select the music contents he or she desires to hear to transmit the information pertinent to the selected music contents to the server system 3. The server system 3 transmits e.g., music contents, as selected by the user from the contents information storage unit 9c, based on the information pertinent to the music contents received from the client 2, to the client 2, which then reproduces the transmitted contents using e.g., a speaker of the output unit 2b.

The sequence of operations from the beginning to the end of the MOD service of furnishing the music contents to the client 2 by the server system 3, in the information purveying system employing the contents selection system 1, is hereinafter explained in accordance with the flowchart shown in FIG. 2.

Figure 2:
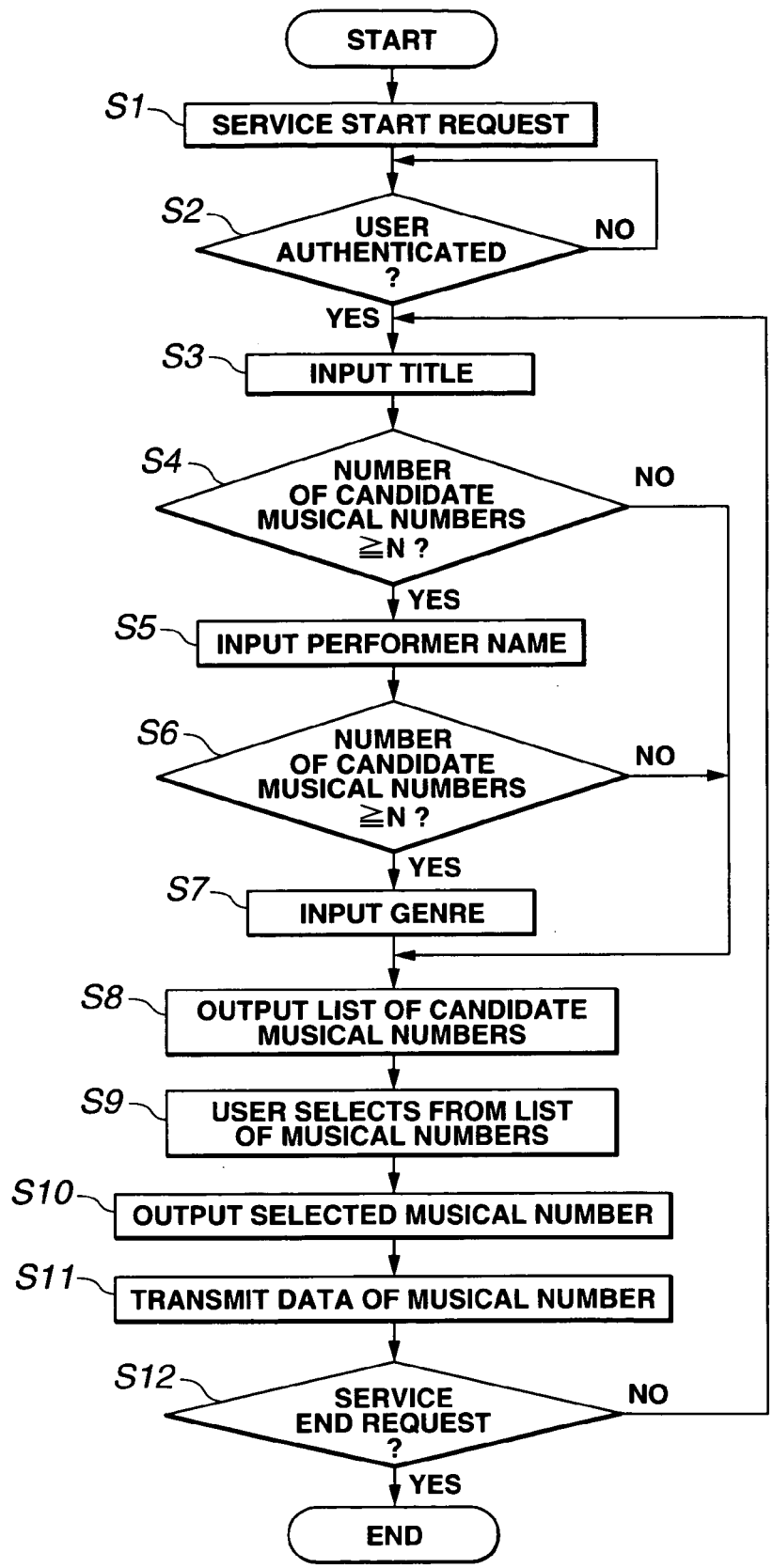
FIG. 2 is a flowchart showing a processing flow since the start until the end of the MOD service in the first embodiment of the present invention.

Referring to the flowchart of FIG. 2, the client 2, as a terminal for IMT-2000, at the outset issues a connection request by e.g. phoning the server system 3 through the base station 4 employing the IMT-2000 data network. Subsequently, the client 2 establishes the connection to the server system 3. That is, in the flowchart of FIG. 2, explanation is made beginning from the state in which the connection between the client 2 and the server system 3 has been established.

First, at step S1 of FIG. 2, when the user inputs the service start request information for utilizing the MOD service to a microphone of the input unit 2a provided on the client 2, the controller 2e is furnished from the input unit 2a with the service start request information (service start request speech information), as the speech information fed to the input unit 2a. The controller 2e sends the service start request speech information, furnished from the input unit 2a, to the communication unit 2d, which then sends the service start request speech information through the base station 4 to the speech recognition server 5 of the server system 3.

The speech recognition server 5 performs speech recognition on the service start request speech information, received from the communication unit 2d through the base station 4, by an acoustic analyzer, an acoustic model and by a language model, not shown. The speech recognition server 5 then furnishes the service start request speech information (referred to below as recognition service start request speech information) to the authentication server 6.

When fed from the speech recognition server 5 with the recognition service start request speech information, the authentication server 6 sends to the client 2 the user authentication request information, requesting the user to input the user ID and the password to the input unit 2a by speech etc. It is noted that the user ID and the password mean the information for authenticating whether or not the user in possession of the client has rights to use the MOD service.

The controller 2e causes the user authentication request information, received from the authentication server 6 through the communication unit 2d, to be output as speech at e.g., a speaker of the output unit 2b.

When the user at step S2 inputs the user ID and the password by speech to e.g., a microphone of the input unit 2a, in accordance with the user authentication request information, output as speech at e.g., the speaker of the output unit 2b, the user ID and the password, as the speech information fed to the input unit 2a, are fed to the input unit 2a of the controller 2e. The communication unit 2d sends the user ID and the password through the base station 4 to the speech recognition server 5 of the server system 3.

The speech recognition server 5 performs speech recognition of the user ID and the password, which is the result of speech recognition, to the authentication server 6. The user ID and the password, representing the result of speech recognition, are sometimes referred to below as the recognized user ID-password.

The authentication server 6 acquires the user ID and the password from the attribute information storage unit 9a of the database 9 and executes authentication processing for authenticating the recognized user ID-password, supplied from the authentication server 6, based on the so-acquired user ID and the password.

If this authentication is not possible, the authentication server 6 sends the service start non-permitting information to the client 2. Based on this service start non-permitting information, received from the authentication server 6 through the communication unit 2d, the controller 2e outputs the effect that the MOD service is not started at e.g., the speaker of the output unit 2b as speech. If the user has learned the effect of non-starting of the MOD service from e.g., the speech from the speaker, and again inputs by speech the user ID and the password correctly in e.g., the microphone of the input unit 2a, the user ID and the password, as the speech information again input to the input unit 2a, are fed from the input unit 2a to the controller 2e.

If the above authentication has been achieved successfully, the authentication server 6 sends the authentication success information to the information preparing server 7 for notifying that authentication has been achieved successfully. If fed with the authentication success information from the authentication server 6, the information preparing server 7 sends the service start permission information and the title input request information, requesting the user to input the title of the music number, to the client 2. The controller 2e causes the service start permission information and the title input request information, received from the information preparing server 7 through the communication unit 2d, to be issued as speech output to e.g., the speaker of the output unit 2b. The processing then moves to step S3.

After the user has learned the service start permission information and the title input request information from the speaker etc, the speech information of the user pertinent to the title of the musical number desired by the user to be furnished at e.g., the microphone of the input unit 2a from the server system 3 is sent to the input unit 2a of the controller 2e. This speech information is referred to below as the title speech information. The controller 2e sends to the communication unit 2d the title speech information furnished to the input unit 2a. The communication unit 2d transmits the title speech information so furnished through the base station 4 to the speech recognition server 5 of the server system 3.

The speech recognition server 5 performs speech recognition of the title speech information received through the communication unit 2d through the base station 4. The speech recognition server 5 sends the title speech information, which is the result of the speech recognition, referred to below as the recognized title speech information, to the information preparing server 7.

At the next step S4, the information preparing server 7 prepares the information for contents selection pertinent to the musical number desired to be furnished from the server system 3, based on the recognized title speech information furnished from the speech recognition server 5 and on the preparation information for one or more titles acquired from the prepared information storage unit 9b. The contents selection information and the preparation information are referred to below as the musical number contents selection information and the title preparation information, respectively.

Specifically, the information preparing server 7 calculates the similarity between the recognized title speech information in the acoustic characteristic quantities and each title preparation information, concerning the title of the musical number that can be furnished by the information purveying system and that is stored in the prepared information storage unit 9b, using a preparation information calculation processor, not shown. This information preparing server 7 calculates the similarity of each title preparation information, stored in the prepared information storage unit 9b, to the recognized title speech information in the acoustic characteristic quantities and each title preparation information. This information preparing server 7 verifies a musical number, for which the calculated value exceeds a pre-set threshold value X, to be a candidate for the musical number the user desires to be furnished from the server system 3.

If the number of the musical numbers corresponding to the title preparation information, the calculated value for which has exceeded the threshold value X, is less than a constant N, the processing moves to step S8.

If conversely the number of the musical numbers corresponding to the title preparation information, the calculated value for which has exceeded the threshold value X, is not less than a constant N, the information preparing server 7 transmits a performer name input request information, requesting the user to input the name of the performer of the musical number, to the client 2, in order to narrow down the number of the candidate musical numbers. The controller 2e causes the performer name input request information, received from the information preparing server 7 through the communication unit 2d, to be issued as speech output at e.g., the speaker of the output unit 2b. The processing then moves to step S5.

After the user has learned the performer name input request information from the speaker etc, the speech information of the user pertinent to the name of a performer of the musical number desired by the user to be furnished at e.g., the microphone of the input unit 2a from the server system 3 (performer name) is sent to the input unit 2a of the controller 2e. This speech information is referred to below as the performer name speech information. The controller 2e sends the performer name speech information, furnished to the input unit 2a, to the communication unit 2d. The communication unit 2d transmits the performer name speech information so furnished through the base station 4 to the speech recognition server 5 of the server system 3.

The speech recognition server 5 performs speech recognition of the performer name speech information received through the communication unit 2d through the base station 4. The speech recognition server 5 sends the performer name speech information, which is the result of the speech recognition, referred to below as the recognized performer name speech information, to the information preparing server 7.

At the next step S6, the information preparing server 7 prepares the information for music number contents selection, based on the recognized performer name speech information furnished from the speech recognition server 5 and on the preparation information for one or more performers acquired from the prepared information storage unit 9b of the database 9 (performer name preparation information). It is noted that the performer name preparation information in this case means only the preparation information pertinent to the performer name acquired from among the information pertinent to the performer name the calculated value for which has exceeded the threshold value X in narrowing down the candidates based on the music number titles. Therefore, the prepared information storage unit 9b memorizes the titles, performer names and the genres pertinent to the respective titles as the contents.

Specifically, the information preparing server 7 calculates the similarity between the recognized performer name speech information in the acoustic characteristic quantities and each performer name preparation information, concerning the title of the musical number that can be furnished by the information purveying system, stored in the prepared information storage unit 9b, using a preparation information calculation processor, not shown. This information preparing server 7 calculates the similarity of each performer name preparation information, stored in the prepared information storage unit 9b, to the recognized performer name speech information in the acoustic characteristic. This information preparing server 7 verifies a musical number, for which the calculated value exceeds a pre-set threshold value X, as being a candidate for the musical number the user desires to be furnished from the server system 3.

If the number of the musical numbers corresponding to the title preparation information, the calculated value for which has exceeded the threshold value X, is less than a constant N, that is if the numbers of the musical numbers corresponding to the title preparation information and the performer name preparation information, the calculated values for which have exceeded the threshold value X in case of using both the title and the performer name, is less than the constant N, the processing moves to step S8.

If conversely the number of the musical numbers corresponding to the performer name preparation information, the calculated value for which has exceeded the threshold value X, in case of using both the title and the performer name is not less than the constant N, the information preparing server 7 transmits a genre input request information, requesting the user to input the genre of the musical number, to the client 2, in order to narrow down the number of the candidate musical numbers. The controller 2e causes the genre input request information, received from the information preparing server 7 through the communication unit 2d, to be issued as speech output at e.g., the speaker of the output unit 2b. The processing then moves to step S7.

After the user has learned the genre input request information from the speaker etc, the speech information of the user pertinent to the genre of the musical number desired by the user to be furnished at e.g., the microphone of the input unit 2a from the server system 3 (performer name) is sent to the input unit 2a of the controller 2e. This speech information is referred to below as the genre speech information. The controller 2e sends the genre speech information, furnished to the input unit 2a, to the communication unit 2d. The communication unit 2d transmits the genre speech information so furnished through the base station 4 to the speech recognition server 5 of the server system 3.

The speech recognition server 5 performs speech recognition of the genre speech information received through the communication unit 2d through the base station 4. The speech recognition server 5 sends the genre speech information, which is the result of the speech recognition, referred to below as the recognized genre speech information, to the information preparing server 7.

The information preparing server 7 prepares the music number contents selection information, based on the recognized genre speech information supplied from the speech recognition server 5, and on the one or more genre preparation information acquired from the prepared information storage unit 9b of the database 9. It is noted that the genre preparation information in this case means only the preparation information pertinent to the genre as acquired from among the information pertinent to the genre the calculated value for which has exceeded the threshold value X in narrowing down the candidates based on the music number titles and the performer name.

Specifically, the information preparing server 7 calculates the similarity between the recognized genre speech information in the acoustic characteristic quantities and each genre preparation information, concerning the genre of the musical number that can be furnished by the information purveying system, stored in the prepared information storage unit 9b, using a preparation information calculation processor, not shown. This information preparing server 7 calculates the similarity of each genre preparation information, stored in the prepared information storage unit 9b, to the recognized genre speech information in the acoustic characteristic quantities. This information preparing server 7 verifies a musical number, for which the calculated value exceeds a pre-set threshold value X, as being a candidate for the musical number the user desires to be furnished from the server system 3.

If the number of the musical numbers corresponding to the title preparation information, the calculated value for which has exceeded the threshold value X, is less than a constant N, that is if the numbers of the musical numbers corresponding to the title preparation information, performer name preparation information and the genre preparation information, the calculated values for which have exceeded the threshold value X in case of using the title, performer name and the genre, is less than the constant N, the processing moves to step S8.

If conversely the number of the musical numbers corresponding to the title preparation information, performer name preparation information and the genre preparation information, the calculated values for which are not less than the constant N, the information preparing server 7 sequentially transmits N musical numbers, beginning from the musical number the calculated value for which is closest to the genre speech information, to the client 2. Thus, the processing also transfers in this case to step S8.

Then, at step S8, if the number of the musical numbers corresponding to the preparation information the calculated value for which has exceeded threshold value X, is not less than the constant N, and the information preparing server 7 has sent the music number contents selection information to the client 2, the controller 2e causes N music number contents selection information to be output as speech at e.g., a speaker of the output unit 2b in a sequence of decreasing similarity to the genre speech information of the corresponding calculated values received from the information preparing server 7 through the communication unit 2d.

In this case, the controller 2e utilizes e.g., an average value of the calculated values pertinent to the title, performer name and the genre, to cause the music number contents selection information, such as a list of N musical numbers, arrayed in the order of decreasing similarity to the input speech information, to be output as speech at e.g., the speaker of the output unit 2b.

On the other hand, if the number of the musical numbers corresponding to the preparation information the calculated value for which has exceeded threshold value X, is not less than the constant N, and the information preparing server 7 has sent the music number contents selection information to the client 2, the controller 2e causes not larger than N music number contents selection information, received at e.g., the speaker of the output unit 2b, to be output as speech at e.g., a speaker of the output unit 2b.

In this case, the controller 2e utilizes e.g., an average value of the calculated values pertinent to the title, performer name and the genre, to cause the music number contents selection information, arrayed in the order of decreasing similarity to the input speech information, to be output as speech at e.g., the speaker of the output unit 2b.

Meanwhile, the music number contents selection information means the entire information, which may prove the result with respect to the speech information input by the user, such as name of the musical number, part of the musical number, performer name, name of a tied-up drama, name of the program in which the musical number is aired, or the name of the composer. The controller 2e may output this music number contents selection information to the output unit 2b as the text or video information, using e.g., the liquid crystal display.

Then, at step S9, after the user has heard the music number contents selection information from e.g., a speaker, the speech information, corresponding to the information pertinent to the musical number selected by the user from a list of the musical numbers, as the music number contents selection information, and which is input as speech at e.g., the microphone of the input unit 2a, is furnished at the input unit 2a of the controller 2e.

Specifically, the speech information, which indicates the number allocated to the item of the list of the musical numbers as the music number contents selection information, is fed from the input unit 2a to the controller 2e.

The speech information, corresponding to the name of the musical number, as the music number contents selection information, input to the inputting unit 2a, is fed from the input unit 2a to the controller 2e.

Moreover, if the output unit 2b is sequentially outputting the list of the musical numbers, as the music number contents selection information, by speech, and the user is desirous to select the musical number currently output by speech, the controller 2e is fed from the input unit 2a with the speech information, such as [this musical number] or [OK] input as speech at the input unit 2a. The input unit 2a may be constructed by a key input device or a jog dial.

If the output unit 2b is sequentially outputting a portion of the musical number as the music number contents selection information and the user is desirous to select the currently reproduced musical number, the controller 2e is fed from the input unit 2a with the speech information, such as [this number] or [OK] input as speech at the input unit 2a. The input unit 2a may again be constructed by a key input device or a jog dial.

If the client 2 has downloaded a list of the musical numbers, conforming to the user's liking, from the server system 3, at the outset, the name of the musical number selected by the user from the list and which is input as speech to the input unit 2a is furnished from the input unit 2a to the controller 2e. The list of the musical numbers, conforming to the user's taste, may also be previously set by the user.

By the above-described operations, the musical number, which the user is desirous to be furnished from the server system 3, is selected from the list etc of the musical numbers as the music number contents selection information.

Then, at step S10, the speech information pertinent to the musical number input at the input unit 2a and which has been selected from the list of the musical numbers is fed from the input unit 2a to the controller 2e. This speech information is referred to below as the selected speech information. The controller 2e sends the selected speech information to the communication unit 2d, which then transmits the selected speech information to the speech recognition server 5 of the server system 3 through the base station 4.

The speech recognition server 5 then performs the speech recognition on the selected speech information received through the base station 4 from the communication unit 2d. The speech recognition server 5 sends the selected speech information, which is the result of speech recognition, to the client 2. The selected speech information, which is the result of speech recognition, is referred to below as the recognized selected speech information.

The controller 2e causes the recognized selected speech information, received from the speech recognition server 5 through the communication unit 2d, to be output as speech to e.g., the speaker of the output unit 2b. The user hears this recognized selected speech information from e.g., the speaker to confirm that the musical number he or she has selected has been correctly recognized by the server system 3.

Then, at step S11, the information purveying server 8 acquires the contents, such as music to be transmitted to the client 2, from the contents information storage unit 9c, based on the recognized selected speech information furnished from the speech recognition server 5, to transmit the so-acquired contents to the client 2. The controller 2e causes the speaker of the output unit 2b to reproduce the contents, such as music, received from the information purveying server 8 through the communication unit 2d.

Then, at step S12, the reproduction of the contents from the output unit 2b comes to a close. If the user continues to utilize the MOD service, the processing reverts to step S3.

On the other hand, if the user has input the service end request information for terminating the use of the MOD service by speech with e.g., the microphone of the input unit 2a, the controller 2e is fed from the input unit 2a with the service end request information, as the speech information fed to the input unit 2a. The service end request information, as the speech information, is referred to below as the service end request speech information. The controller 2e furnishes the service end request speech information, supplied from the input unit 2a, to the communication unit 2d. The communication unit 2d transmits the service end request speech information through the base station 4 to the speech recognition server 5 of the server system 3.

The speech recognition server 5 performs speech recognition on the service end request speech information, received through the base station 4 from the communication unit 2d, by an acoustic analyzer, an acoustic model and on a language model, not shown. The speech recognition server 5 then furnishes the service end request speech information (referred to below as recognized service end request speech information) to the information preparing server 7.

When fed with the service end request speech information from the speech recognition server 5, the information preparing server 7 sends the service end permission information as speech to the client 2.

The controller 2e causes the service end permission information, received from the information preparing server 7 through the communication unit 2d, to be output as speech at e.g., a speaker of the controller 2e.

The user hears the service end permission information as speech from the speaker etc to recognize the end of the MOD service.

By the above processing, the user is able to accept the MOD service from the server system 3.

In the above-described sequence of operations, employing the flowchart shown in FIG. 2, the input unit 2a is e,g., a microphone fed with the information with speech. Similarly, the picture and the speech can be output simultaneously using the speaker or the liquid crystal display etc.

In the sequence of operations, shown in the flowchart of FIG. 2, the speech recognition server 5 sends the recognized speech information directly to the authentication server 6 or to the information preparing server 7. Alternatively, the recognized speech information may also be transmitted to the client 2 in order to have the user confirm whether or not the result of speech recognition is correct.

If the user has recognized that the recognized speech information received from the speech recognition server 5 and output by speech via the speaker was in error, the controller 2e may be fed from the input unit 2a with the speech information comprising the speech information such as "cancel" or "re-try" re-fed by the user correctly to the input unit 2a. Of course, the controller 2e may be fed from the input unit 2a with the speech information comprising the information re-input correctly to the input unit 2a by the user pressing the [clear key].

In the sequence of operations by the flowchart shown in FIG. 2, the service is started by the user inputting the service start request information to the input unit 2a with speech. Alternatively, the service may be started when the client 2 phones the server system 3 to establish the connection.

If, in the sequence of operations of the flowchart shown in FIG. 2, the use of the MOD service is to be terminated during use of the MOD service in the information purveying system employing the contents selection system 1, the controller 2e may be fed from the input unit 2a with the speech information comprising the disconnect speech information commanding the disconnection from the network and which is re-input by the user to the input unit 2a to interrupt the connection with respect to the server system 3 through the base station 4 to terminate the MOD service. Of course, the user may input an [end-key], not shown, of the input unit 2a to interrupt the connection with the server system 3 through the base station 4 to terminate the MOD service.

Moreover, the controller 2e may be fed at step S2 of the flowchart of FIG. 2 with the user ID and the password, fed by the user as the speech to the input unit 2a, from this input unit 2a. However, the controller 2e of the client 2 for e.g., the IMT-2000 may be fed at the input unit 2a with only the password input by the user with speech to the input unit 2a, because each client 2 for the IMT-2000 holds the user ID different from those of other clients from the outset.

In the information purveying system, employing the contents selection system 1 exploiting the method other than the above-described method for preparing the musical number contents selection information, the sequence of operations from the start until the end of the MOD service is explained with reference to the flowchart of FIG. 3. This processing differs from the above-described processing in that it is up to the server system 3 to verify with which information input next time the contents selection information can be prepared promptly to have the user input the verified information.

Figure 3:
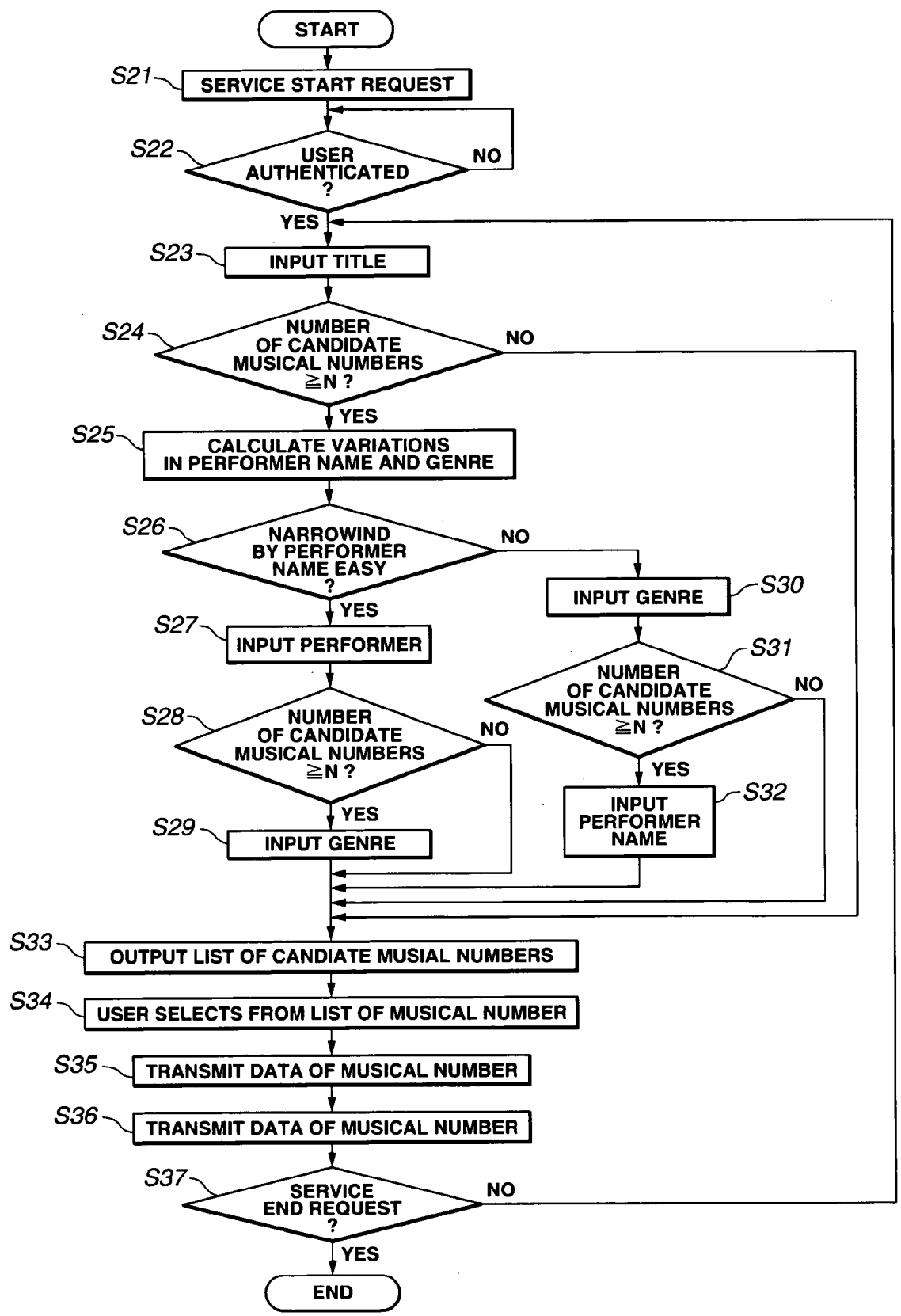
FIG. 3 is a flowchart showing a processing flow since the start until the end of the MOD service in a second embodiment of the present invention.

Referring to the flowchart of FIG. 3, the client 2, as a terminal for IMT-2000, at the outset issues a connection request by e.g. phoning the server system 3 through the base station 4 employing the IMT-2000 data network. Subsequently, the client 2 establishes the connection to the server system 3. That is, in the flowchart of FIG. 3, explanation is made beginning from the state in which the connection between the client 2 and the server system 3 has been established.

The processing in the second embodiment shown in FIG. 3 is similar to that in the processing shown in FIG. 2, except that the processing from step S4 to step S8 in the flowchart of FIG. 2 is replaced by the processing from step S24 to step S33 in the flowchart of FIG. 3.

First, if the user inputs the service start request information to e.g., a microphone of the input unit 2a provided on the client 2 with speech, the controller 2e is fed from the input unit 2a with the service start request speech information fed to the input unit 2a. The controller 2e furnishes the service start request speech information, sent from the input unit 2a, to the communication unit 2d. The communication unit 2d transmits the service start request speech information through the base station 4 to the speech recognition server 5 of the server system 3. The speech recognition server 5 performs speech recognition on the service end request speech information, received through the base station 4 from the communication unit 2d, by an acoustic analyzer, an acoustic model and on a language model, not shown. The speech recognition server 5 then furnishes the recognized service start request speech information, which is the result of the speech recognition, to the authentication server 6.

When fed from the speech recognition server 5 with the recognized service start request speech information, the authentication server 6 transmits to the client 2 the user authentication request information, requesting the user to input the user ID and the password by speech to the input unit 2a. The user ID and the password is used in order to verify whether or not the user owning the client 2 has the right to exploit the MOD service.

The controller 2e causes the user authentication request information, received from the authentication server 6 through the communication unit 2d, to be output as speech to e.g., a speaker of the output unit 2b.

If the user at step S22 inputs the user ID and the password by speech to the microphone of the input unit 2a, in accordance with the user authentication request information, output as speech from the speaker of the output unit 2b, the controller 2e is fed from the input unit 2a with the user ID and the password as the speech information fed to the input unit 2a. The controller 2e sends the user ID and the password, supplied from the input unit 2a, to the communication unit 2d, which then transmits the user ID and the password supplied thereto through the base station 4 to the speech recognition server 5 of the server system 3.

The speech recognition server 5 performs speech recognition on the user ID and the password received from the communication unit 2d through the base station 4. The speech recognition server 5 furnishes the recognized user ID and the password, which is the result of the speech recognition, to the authentication server 6.

The authentication server 6 acquires the user ID and the password from the attribute information storage unit 9*a* of the database 9 and performs the authentication processing of the recognized user ID and the password, supplied from the speech recognition server 5, based on the so-acquired user ID and the password.

If this authentication is not possible, the authentication server 6 sends the service start non-permitting information to the client 2. Based on this service start non-permitting information, received from the authentication server 6 through the communication unit 2*d*, the controller 2*e* outputs the effect that the MOD service is not started at e.g., the speaker of the output unit 2*b* as speech. If the user has learned the effect of non-starting of the MOD service from e.g., the message from the speaker, and again inputs by speech the user ID and the password correctly in e.g., the microphone of the input unit 2*a*, the user ID and the password, as the speech information again input to the input unit 2*a*, are fed from the input unit 2*a* to the controller 2*e*.

If the above authentication has been achieved successfully, the authentication server 6 sends the authentication success information to the information preparing server 7 for notifying that authentication has been achieved successfully. If fed with the authentication success information from the authentication server 6, the information preparing server 7 sends the service start permission information and the title input request information, requesting the user to input the tile of the music number, to the client 2. The controller 2*e* causes the service start permission information and the title input request information, received from the information preparing server 7 through the communication unit 2*d*, to be issued as speech output to e.g., the speaker of the output unit 2*b*. The processing then moves to step S23. After the user has learned the service start permission information at step S23, the title speech information, input by the user by speech over the microphone of the input unit 2*a*, is sent from the input unit 2*a* to the controller 2*e*. The controller 2*e* sends to the communication unit 2*d* the title speech information furnished to the input unit 2*a*. The communication unit 2*d* transmits the title speech information so furnished through the base station 4 to the speech recognition server 5 of the server system 3.

The speech recognition server 5 performs speech recognition of the title speech information received through the communication unit 2*d* through the base station 4. The speech recognition server 5 sends the recognized title speech information, which is the result of the speech recognition, to the information preparing server 7.

At the next step S24, the information preparing server 7 prepares the musical number contents selection information, based on the recognized title speech information furnished from the speech recognition server 5 and on the title preparation information for one or more titles acquired from the prepared information storage unit 9*b* of the database 9.

Specifically, the information preparing server 7 calculates the similarity between the recognized title speech information in the acoustic characteristic quantities and each title preparation information, concerning the title of the musical number that can be furnished by the information purveying system, stored in the prepared information storage unit 9*b*, using a preparation information calculation processor, not shown. This information preparing server 7 calculates the similarity of each title preparation information, stored in the prepared information storage unit 9*b*, to the recognized title speech information in the acoustic characteristic quantities. This information preparing server 7 verifies a musical number, for which the calculated value exceeds a pre-set threshold value X, as being a candidate for the musical number the user desires to be furnished from the server system 3.

If the number of the musical numbers corresponding to the title preparation information, the calculated value for which has exceeded the threshold value X, is less than a constant N, the processing moves to step S33.

If at step S25 the number of the musical numbers corresponding to the title preparation information, the calculated value for which has exceeded the threshold value X, is not less than a constant N, the information preparing server 7 acquires and uses the preparation information as speech of the performer name and the genre pertinent to the candidate determined from the title input information from the prepared information storage unit 9*b* to calculate the variations of the preparation information for the performer name and that of the genre from one category to another. Meanwhile, there are occasions where narrowing down of the number of the candidate musical numbers can be achieved more quickly the larger the degree of variations with respect to the input speech information from the user.

If, at step S26, the degree of variations of the speech information for the genre is larger, the information preparing server 7 transmits the genre request information to the client 2. The controller 2*e* causes the genre input request information, received from the information preparing server 7 through the communication unit 2*d* and the controller 2*e*, to the speaker of the output unit 2*b* as speech. The processing then moves to step S30.

If the degree of variations of the speech information for the performer name is larger, the information preparing server 7 transmits the performer name input request information to the client 2. The controller 2*e* causes the performer name input request information, received from the information preparing server 7 through the communication unit 2*d*, to e.g., the speaker of the output unit 2*b* as speech. The processing then moves to step S27.

After the user has learned the service start permission information at step S27, the speech information on the performer name input by the user by speech over the microphone of the input unit 2*a*, is sent from the input unit 2*a* to the controller 2*e*. The speech information on the performer name is referred to below as the performer name speech information. The controller 2*e* sends to the communication unit 2*d* the performer name speech information furnished from the input unit 2*a*. The communication unit 2*d* transmits the performer name speech information so furnished through the base station 4 to the speech recognition server 5 of the server system 3.

The speech recognition server 5 performs speech recognition of the performer name speech information received through the communication unit 2*d* through the base station 4. The speech recognition server 5 sends the recognized performer name speech information, which is the result of the speech recognition, to the information preparing server 7.

At the next step S28, the information preparing server 7 prepares the musical number contents selection information, based on the recognized title speech information furnished from the speech recognition server 5 and on the title preparation information for one or more pieces of the performer name preparation information acquired from the prepared information storage unit 9*b* of the database 9. It is noted that the performer name preparation information means only the performer name related preparation information acquired from among the information the calculated values of which have exceeded the threshold value X on title-based narrowing down. Therefore, the prepared information storage unit 9b memorizes the title, performer name, genre etc pertinent to each musical number as the contents. Specifically, the information preparing server 7 calculates the similarity between the recognized performer name speech information in the acoustic characteristic quantities and each performer name preparation information, concerning the performer name of the musical number that can be furnished by the information purveying system, and that is stored in the prepared information storage unit 9b, using a preparation information calculation processor, not shown. This information preparing server 7 calculates the similarity of each performer name preparation information, stored in the prepared information storage unit 9b, to the recognized performer name speech information in the acoustic characteristic quantities. This information preparing server 7 verifies a musical number, for which the calculated value exceeds a pre-set threshold value X, as being a candidate for the musical number the user desires to be furnished from the server system 3.

If the number of the musical numbers corresponding to the performer name preparation information, the calculated value for which has exceeded the threshold value X, is less than a constant N, that is if the number of musical numbers corresponding to the title preparation information and the performer name preparation information, for which the calculated values have exceeded the threshold value X in case of using both the title and the performer name, is not larger than the constant N, the processing moves to step S33. If conversely the number of musical numbers corresponding to the title preparation information and the performer name preparation information, for which the calculated values have exceeded the threshold value X in case of using both the title and the performer name, is larger than the constant N, the information preparing server 7 transmits the input request information, requesting the user to input the genre of the musical number, to the client 2, in order to narrow down the number of the candidate musical numbers. The controller 2e causes the genre inputting request information, received from the information preparing server 7 through the communication unit 2d, to be output as speech at the speaker of the output unit 2b. The processing then moves to step S29.

Then, at step S29, after the user hears the genre inputting request information at the speaker, the controller 2e is fed from the input unit 2a with the genre speech information, input as speech by the user at the speaker of the output unit 2b. The controller 2e is fed from the input unit 2a with the genre speech information input by the user as speech at the microphone of the input unit 2a. The controller 2e furnishes the genre speech information, fed from the input unit 2a, to the communication unit 2d. The communication unit 2d transmits the furnished genre speech information through the base station 4 to the speech recognition server 5 of the server system 3.

The speech recognition server 5 performs speech recognition on the genre speech information received from the communication unit 2d through the base station 4. The speech recognition server 5 sends the recognized genre speech information, which is the result of this speech recognition, to the information preparing server 7.

The information preparing server 7 prepares the musical number contents selection information, based in the genre speech information furnished from the speech recognition server 5 and one or more genre preparation information acquired from the prepared information storage unit 9b of the database 9. It is noted that the genre preparation information in this case means only the preparation information pertinent to the genre acquired from among the information the calculated values for which on narrowing down by the title and the performer name have exceeded the threshold value X.

Specifically, the information preparing server 7 calculates the similarity of each genre preparation information, pertinent to the genre of the musical numbers that can be purveyed by the information purveying system and that is stored in the prepared information storage unit 9b, to the recognized title speech information in the acoustic characteristic quantities, using a preparation information calculating unit, not shown. This information preparing server 7 calculates similarity of each genre preparation information stored in the prepared information storage unit 9b with respect to the recognized genre speech information in the acoustic characteristic quantities. This information preparing server 7 verifies a musical number, for which the calculated value exceeds a pre-set threshold value X, as being a candidate for the musical number the user desires to be furnished from the server system 3.

If the number of the musical numbers corresponding to the performer name preparation information, the calculated value for which has exceeded the threshold value X, is less than a constant N, that is if the number of musical numbers corresponding to the title preparation information, performer name preparation information and the genre preparation information, for which the calculated values have exceeded the threshold value X in case of using the title, performer name and the genre, is less than the constant N, the processing moves to step S33.

If conversely the number of musical numbers corresponding to the title preparation information, performer name preparation information and the genre preparation information, for which the calculated values have exceeded the threshold value X in case of using the title, performer name and the genre, is not less than the constant N, the information preparing server 7 sequentially transmits N musical numbers, in the order of decreasing similarity to the genre speech information, to the client 2. That is, in this case, the processing again moves to step S33.

At steps S30 to S32, the processing similar to that in the steps S27 to S29 is carried out, except that, in these steps S30 to S32, the imputing is by speech in the sequence of the genre and the performer name.

Then, at step S33, if the number of the musical numbers corresponding to the genre preparation information the calculated values for which have exceeded the threshold value X, is lesser than the constant N, and the information preparing server 7 has sent the musical number contents selection information to the client 2, the controller 2e causes not more than N musical number contents selecting information, received from the information preparing server 7 through the communication unit 2d, to be output as speech at the speaker of the output unit 2b.

In this case, the controller 2e utilizes e.g., an average value of the calculated values pertinent to the title, performer name and the genre, to cause a list etc of the music number contents selection information, arrayed in the order of decreasing similarity to the input speech information, to be output as speech at e.g., the speaker of the output unit 2b.

Meanwhile, the music number contents selection information means the entire information, which may prove the result to the speech information input by the user, such as name of the musical number, part of the musical number, performer name, name of a tied-up drama, name of the program in which the musical number is aired, or the name of the composer of the musical number. The controller 2e may output this music number contents selection information to the output unit 2b as the text or video information, using e.g., the liquid crystal display.

On the other hand, if the number of the musical numbers corresponding to the genre preparation information the calculated values for which have exceeded the threshold value X, is not less than the constant N, and the information preparing server 7 has sent the musical number contents selection information to the client 2, the controller 2e causes N musical number contents selection information, received from the information preparing server 7 through the communication unit 2d, arrayed in the sequence of the decreasing similarity to the genre speech information, to be output as speech at e.g., the speaker of the output unit 2b.

In this case, the controller 2e utilizes e.g., an average value of the calculated values pertinent to the title, performer name and the genre, to cause a list etc of the music number contents selection information, arrayed in the order of decreasing similarity to the input speech information to be output as speech at e.g., the speaker of the output unit 2b.

Then, at step S34, after the user has heard the music number contents selection information from e.g., a speaker, the speech information, corresponding to the information pertinent to the musical number selected by the user from a list of the musical numbers, as the music number contents selection information, and which is input as speech at e.g., the microphone of the input unit 2a, is furnished at the input unit 2a of the controller 2e.

Specifically, the speech information, which indicates the number allocated to the item of the list of the musical numbers as the music number contents selection information, is fed from the input unit 2a to the controller 2e.

The speech information, corresponding to the name of the musical number, as the music number contents selection information, input to the inputting unit 2a as speech, is fed from the input unit 2a to the controller 2e.

Moreover, if the output unit 2b is sequentially outputting the list of the musical numbers, as the music number contents selection information, by speech, and the user is desirous to select the musical number currently output by speech, the controller 2e is fed from the input unit 2a with the speech information, such as [this number] or [OK] input as speech at the input unit 2a. In this case, the input unit 2a may be constructed by a key input device or a jog dial.

If the output unit 2b is sequentially outputting a portion of the musical number as the music number contents selection information and the user is desirous to select the currently reproduced musical number, the controller 2e is fed from the input unit 2a with the speech information, such as [this number] or [OK] input as speech at the input unit 2a. The input unit 2a may again be constructed by a key input device or a jog dial.

If the client 2 at the outset has downloaded a list of the musical numbers, conforming to the user's liking, from the server system 3, the name of the musical number selected by the user from the list and which is input as speech to the input unit 2a is furnished from the input unit 2a to the controller 2e. The list of the musical numbers, conforming to the user's taste, may also be previously set by the user.

By the above-described operations, the musical number, which the user is desirous to be furnished from the server system 3, is selected from the list etc of the musical numbers as the music number contents selection information.

Then, at step S35, the selected speech information, input at the input unit 2a is fed from the input unit 2a to the controller 2e. This speech information is referred to below as the selected speech information. The controller 2e sends the selected speech information. Furnished from the input unit 2a, to the communication unit 2d, which then transmits the selected speech information as furnished to the speech recognition server 5 of the server system 3 through the base station 4.

The speech recognition server 5 then performs the speech recognition on the selected speech information received through the base station 4 from the communication unit 2d. The speech recognition server 5 sends the selected speech information, which is the result of speech recognition, to the client 2.

The controller 2e causes the recognized selected speech information, received from the speech recognition server 5 through the communication unit 2d, to be output as speech to e.g., the speaker of the output unit 2b. The user hears this recognized selected speech information from e.g., the speaker to confirm that the musical number he or she has selected has been correctly recognized by the server system 3.

Then, at step S36, the information purveying server 8 acquires the contents, such as music, to be transmitted to the client 2, from the contents information storage unit 9c, based on the recognized selected speech information furnished from the speech recognition server 5, to transmit the so-acquired contents to the client 2. The controller 2e causes the speaker of the output unit 2b to reproduce the contents, such as music, received from the information purveying server 8 through the communication unit 2d.

Then, at step S37, the reproduction of the contents from the output unit 2b comes to a close. If the user continues to utilize the MOD service, the processing reverts to step S3.

On the other hand, if the user has input the service end request information for terminating the use of the MOD service by speech with e.g., the microphone of the input unit 2a, the controller 2e is fed from the input unit 2a with the service end request speech information input to the input unit 2a. The controller 2e furnishes the service end request speech information, supplied from the input unit 2a, to the communication unit 2d. The communication unit 2d transmits the service end request speech information through the base station 4 to the speech recognition server 5 of the server system 3.

The speech recognition server 5 performs speech recognition on the service end request speech information, received through the base station 4 from the communication unit 2d, by an acoustic analyzer, an acoustic model and on a language model, not shown. The speech recognition server 5 then furnishes the service end request speech information to the information preparing server 7.

When fed with the service end request speech information from the speech recognition server 5, the information preparing server 7 sends the service end permission information as speech to the client 2.

The controller 2e causes the service end permission information, received from the information preparing server 7 through the communication unit 2d, to be output as speech at e.g., a speaker of the controller 2e.

The user hears the service end permission information as speech from the speaker etc to recognize the end of the MOD service.

By the above processing, in which the server system 3 verifies which information input next enables the contents selection information to be prepared quickly, the user is able to receive the MOD service from the server system 3 more quickly and more accurately than with the contents selection system of the first embodiment described above. The sequence of operations as from the start until the end of the MOD service, in the information purveying system employing an outputting method other than the above-described method of outputting the list of candidate musical numbers, is explained with reference to the flowchart of FIG. 4. This processing differs from the above-described processing in that the server system 3 verifies which list of the musical numbers as the musical number contents selection information is to be output to enable the user to select the target number readily, with the list of the musical numbers being output based on this decision.

Figure 4:
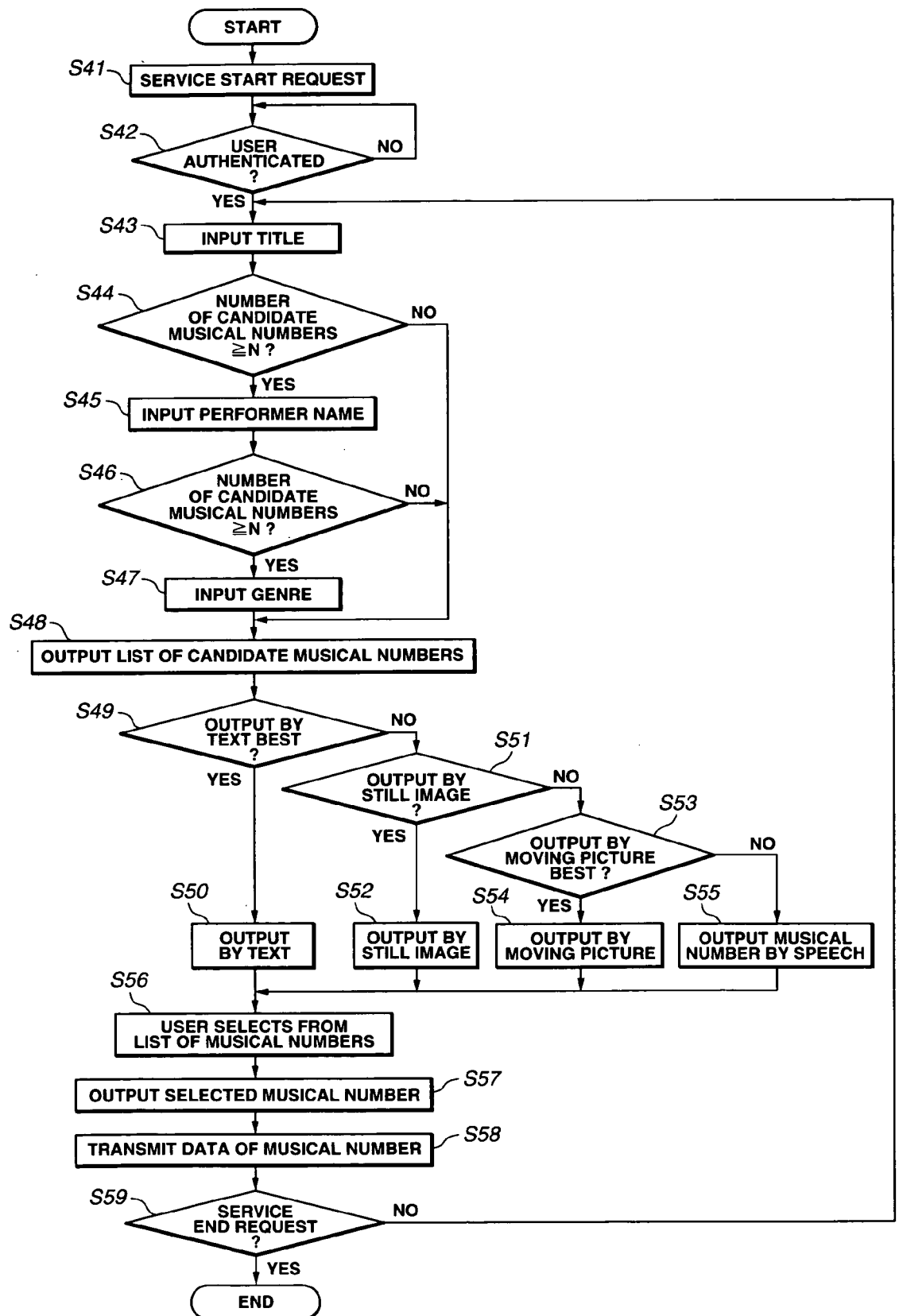
FIG. 4 is a flowchart showing a processing flow since the start until the end of the MOD service in a third embodiment of the present invention.

Referring to the flowchart of FIG. 4, the client 2, as a terminal for IMT-2000, at the outset issues a connection request by e.g. phoning the server system 3 through the base station 4 employing the IMT-2000 data network. Subsequently, the client 2 establishes the connection to the server system 3. That is, in the flowchart of FIG. 3, explanation is made beginning from the state in which the connection between the client 2 and the server system 3 has been established.

The processing in the second embodiment shown in FIG. 4 is similar to that in the processing shown in FIG. 2, except that the processing from step S4 to step S8 in the flowchart of FIG. 2 is replaced by the processing from step S44 to step S55 in the flowchart of FIG. 4.

First, if the user inputs the service start request information to e.g., a microphone of the input unit 2a provided on the client 2 with speech, the controller 2e is fed from the input unit 2a with the service start request speech information fed to the input unit 2a. The controller 2e furnishes the service start request speech information, sent from the input unit 2a, to the communication unit 2d. The communication unit 2d transmits the service start request speech information through the base station 4 to the speech recognition server 5 of the server system 3. The speech recognition server 5 performs speech recognition on the service end request speech information, received through the base station 4 from the communication unit 2d, by an acoustic analyzer, an acoustic model and on a language model, not shown. The speech recognition server 5 then furnishes the recognized service start request speech information, which is the result of the speech recognition, to the authentication server 6.

When fed from the speech recognition server 5 with the recognized service start request speech information, the authentication server 6 transmits to the client 2 the user authentication request information, requesting the user owning the client 2 to input the user ID and the password by speech to the input unit 2a. The user ID and the password are used in order to verify whether or not the user owning the client 2 has the right to exploit the MOD service.

The controller 2e causes the user authentication request information, received from the authentication server 6 through the communication unit 2d, to be output as speech to e.g., a speaker of the output unit 2b.

If the user at step S42 inputs the user ID and the password by speech to the microphone of the input unit 2a, in accordance with the user authentication request information, output as speech from the speaker of the output unit 2b, the controller 2e is fed from the input unit 2a with the user ID and the password as the speech information fed to the input unit 2a. The controller 2e sends the user ID and the password, supplied from the input unit 2a, to the communication unit 2d, which then transmits the user ID and the password supplied thereto through the base station 4 to the speech recognition server 5 of the server system 3.

The speech recognition server 5 performs speech recognition on the user ID and the password received from the communication unit 2d through the base station 4. The speech recognition server 5 furnishes the recognized user ID and the password, which is the result of the speech recognition, to the authentication server 6.

The authentication server 6 acquires the user ID and the password from the attribute information storage unit 9a of the database 9 and performs the authentication processing on the recognized user ID and the password, supplied from the speech recognition server 5, based on the so-acquired user ID and the password.

If this authentication is not possible, the authentication server 6 sends the service start non-permitting information to the client 2. Based on this service start non-permitting information, received from the authentication server 6 through the communication unit 2d, the controller 2e outputs the effect that the MOD service is not started based on the service start non-permitting information at e.g., the speaker of the output unit 2b as speech. If the user has learned the effect of non-starting of the MOD service from e.g., the message from the speaker, and again inputs by speech the user ID and the password correctly in e.g., the microphone of the input unit 2a, the user ID and the password, as the speech information again input to the input unit 2a, are fed from the input unit 2a to the controller 2e.

If the above authentication has been achieved successfully, the authentication server 6 sends the authentication success information to the information preparing server 7 for notifying that authentication has been achieved successfully. If fed with the authentication success information from the authentication server 6, the information preparing server 7 sends the service start permission information and the title input request information, requesting the user to input the tile of the music number, to the client 2. The controller 2e causes the service start permission information and the title input request information, received from the information preparing server 7 through the communication unit 2d, to be issued as speech output to e.g., the speaker of the output unit 2b. The processing then moves to step S43. After the user has learned the service start permission information and the title inputting request information at e.g., the speaker, the title speech information, input by the user by speech over the microphone of the input unit 2a, is sent from the input unit 2a to the controller 2e. The controller 2e sends to the communication unit 2d the title speech information furnished to the input unit 2a. The communication unit 2d transmits the title speech information so furnished through the base station 4 to the speech recognition server 5 of the server system 3.

The speech recognition server 5 performs speech recognition on the title speech information received through the communication unit 2d through the base station 4. The speech recognition server 5 sends the recognized title speech information, which is the result of the speech recognition, to the information preparing server 7.

Specifically, the information preparing server 7 at step S44 calculates the similarity of the recognized title speech information in the acoustic characteristic quantities, to one or more title preparation information, using a preparation information calculating unit, not shown. This information preparing server 7 calculates similarity of each title preparation information stored in the prepared information storage unit 9b to the recognized genre speech information in the acoustic characteristic quantities. This information preparing server 7 verifies a musical number, for which the calculated value exceeds a pre-set threshold value X, as being a candidate for the musical number the user desires to be furnished from the server system 3.

If the number of the musical numbers corresponding to the title preparation information, the calculated value for which has exceeded the threshold value X, is less than a constant N, the processing moves to step S48, in order for the information preparing server 7 to prepare the musical number contents selection information, as a list of candidate musical numbers.

On the other hand, if the number of the musical numbers corresponding to the title preparation information, the calculated value for which has exceeded the threshold value X, is not less than the constant N, the information preparing server 7 transmits the performer name input request information, requesting the user to input the name of the performer of the musical number to the client, in order to narrow down the number of the candidate musical numbers. The controller 2e causes the performer name input request information, received from the information preparing server 7 through the communication unit 2d, to be output as speech at e.g., a speaker of the output unit 2b. The processing then moves to step S45.

Then, at step S45, after the user hears the performer name inputting request information at the speaker, the controller 2e is fed from the input unit 2a with the performer name speech information, input as speech by the user at the speaker of the output unit 2b. The controller 2e is fed from the input unit 2a with the performer name speech information input by the user as speech at the microphone of the input unit 2a. The controller 2e furnishes the genre speech information, fed from the input unit 2a, to the communication unit 2d. The communication unit 2d transmits the furnished genre speech information through the base station 4 to the speech recognition server 5 of the server system 3.

The speech recognition server 5 performs speech recognition on the genre speech information received from the communication unit 2d through the base station 4. The speech recognition server 5 sends the recognized genre speech information, which is the result of this speech recognition, to the information preparing server 7.

The information preparing server 7 then calculates at step S46 the similarity of the recognized performer name speech information in the acoustic characteristic quantities, to one or more performer name preparation information, pertinent to the performer name of the musical number, that is stored in the prepared information storage unit 9b and that can be purveyed by the information purveying system, using a preparation information calculating unit, not shown. This information preparing server 7 calculates similarity of each performer name preparation information stored in the prepared information storage unit 9b to the recognized performer name speech information in the acoustic characteristic quantities. This information preparing server 7 verifies a musical number, for which the calculated value exceeds a pre-set threshold value X, as being a candidate for the musical number the user desires to be furnished from the server system 3.

If the number of the musical numbers corresponding to the performer name preparation information, the calculated value for which has exceeded the threshold value X, is less than a constant N, that is if the number of musical numbers corresponding to the title preparation information and to the performer name preparation information, for which the calculated values have exceeded the threshold value X in case of using both title and the performer name, is less than the constant N, the processing moves to step S48, in order for the information preparing server 7 to prepare the musical number contents selection information as a list of the candidate musical numbers.

If conversely the number of musical numbers corresponding to the title preparation information and the performer name preparation information, for which the calculated values have exceeded the threshold value X in case of using the title and the performer name, is not less than the constant N, the information preparing server 7 transmits the genre input request information requesting the user to input the genre of the musical number in order to narrow down the number of the candidate musical numbers. The controller 2e causes the genre input request information, received from the information preparing server 7 through the communication unit 2d, to be output as speech at e.g., a speaker of the output unit 2b. The processing then moves to step S47.

Then, at step S47, after the user hears the genre inputting request information at the speaker, the controller 2e is fed from the input unit 2a with the genre speech information, input as speech by the user at the microphone of the input unit 2a. The controller 2e furnishes the genre speech information, fed from the input unit 2a, to the communication unit 2d. The communication unit 2d transmits the furnished genre speech information through the base station 4 to the speech recognition server 5 of the server system 3.

The speech recognition server 5 performs speech recognition on the genre speech information received from the communication unit 2d through the base station 4. The speech recognition server 5 sends the recognized genre speech information, which is the result of this speech recognition, to the information preparing server 7.

The information preparing server 7 then calculates the similarity of the recognized genre speech information in the acoustic characteristic quantities to one or more genre preparation information, pertinent to the genre of the musical number, that is stored in the prepared information storage unit 9b and that can be purveyed by the information purveying system, using a preparation information calculating unit, not shown. This information preparing server 7 calculates similarity of each genre preparation information stored in the prepared information storage unit 9b to the recognized genre speech information in the acoustic characteristic quantities. This information preparing server 7 verifies a musical number, for which the calculated value exceeds a pre-set threshold value X, as being a candidate for the musical number the user desires to be furnished from the server system 3.

If the number of the musical numbers corresponding to the genre preparation information, the calculated value for which has exceeded the threshold value X, is less than a constant N, that is if the number of musical numbers corresponding to the title preparation information, performer name preparation information and to the genre preparation information, for which the calculated values have exceeded the threshold value X in case of using the title, performer name and the genre, is less than the constant N, the processing moves to step S48, in order for the information preparing server 7 to prepare the musical number contents selection information as a list of the candidate musical numbers.

If conversely the number of musical numbers corresponding to the title preparation information, performer name preparation information and the genre preparation information, for which the calculated values have exceeded the threshold value X in case of using the title, performer name and the genre, is not less than the constant N, the processing moves to step S48, in order for the information preparing server 7 to prepare the musical number contents selection information as a list of the candidate musical numbers. It is noted that the musical number contents selection information in this case is sequentially made up of N items in the order of the decreasing similarity to the genre speech information.

If, at step S48, the number of the musical numbers corresponding to the preparation information the calculated value for which has exceeded the threshold value X is less than the constant N, the information preparing server 7 prepares the musical number contents selection information which is a list of less than N candidate musical numbers. On the other hand, if the number of the musical numbers, corresponding to the above-mentioned preparation information, the calculated value for which exceeds the threshold value X, is not less than N, the information preparing server 7 prepares the musical number contents selection information which is a list of N candidate musical numbers sequentially acquired in the sequence of the decreasing similarity of the calculated values to the genre speech information.

Then, at step S49, the information preparing server 7 checks whether or not the prepared musical number contents selection information had better be output by text as e.g., the text representation for facility in selection of the musical number by the user, using an optimum outputting state check unit, not shown. If the information preparing server 7 has not given a decision that the output as text is optimum, the processing moves to step S51.

On the other hand, the information preparing server 7 checks whether or not the prepared musical number contents selection information had better be output by text by e.g., the text representation for facility in selection of the musical number by the user, using an optimum outputting state check unit, not shown. If the information preparing server 7 has given a decision that the output as text is optimum, the information preparing server 7 transmits the musical number contents selection information for outputting the text to the client 2. If, at step S50, the number of the musical numbers corresponding to the preparation information the calculated value for which has exceeded the threshold value X is less than the constant N, and the information preparing server 7 has sent the musical number contents selection information to the client 2, the controller 2e causes less than N musical number contents selection information, received from the information preparing server 7 through the communication unit 2d, to be demonstrated as text on a liquid crystal display of the output unit 2b.

On the other hand, if the number of the musical numbers corresponding to the preparation information, the calculated value for which has exceeded the threshold value X is not less than the constant number N, and the information preparing server 7 has sent the musical number contents selection information to the client 2, the controller 2e causes the M musical number contents selection information received from the information preparing server 7 through the information preparing server 7 to be demonstrated as text on e.g., a liquid crystal display of the output unit 2b in the sequence of the decreasing similarity to the genre speech information.

Then, at step S51, the information preparing server 7 checks whether or not the prepared musical number contents selection information had better be output as a still image for facility in selection of the musical number by the user, using an optimum outputting state check unit, not shown. If the information preparing server 7 has not given a decision that the output as still image is optimum, the processing moves to step S53.

On the other hand, the information preparing server 7 checks whether or not the prepared musical number contents selection information had better be output by a still image by e.g., a jacket photo of a CD for facility in selection of the musical number by the user, using an optimum outputting state check unit, not shown. If the information preparing server 7 has given a decision that the output as a still image is optimum, the information preparing server 7 transmits the musical number contents selection information for outputting the still image is transmitted to the client 2.

If, at step S52, the number of the musical numbers corresponding to the preparation information the calculated value for which has exceeded the threshold value X is less than the constant N, and the information preparing server 7 has sent the musical number contents selection information to the client 2, the controller 2e causes less than N musical number contents selection information, received from the information preparing server 7 through the communication unit 2d, to be demonstrated as still image on a liquid crystal display of the output unit 2b.

On the other hand, if the number of the musical numbers corresponding to the preparation information, the calculated value for which has exceeded the threshold value X is not less than the constant number N, and the information preparing server 7 has sent the musical number contents selection information to the client 2, the controller 2e causes the N musical number contents selection information, received from the information preparing server 7 through the information preparing server 7, to be demonstrated as still image on e.g., a liquid crystal display of the output unit 2b in the sequence of the decreasing similarity to the genre speech information.

Then, at step S53, the information preparing server 7 checks whether or not the prepared musical number contents selection information had better be output as a moving picture, such as with Video Clip, for facility in selection of the musical number by the user, using an optimum outputting state check unit, not shown. If the information preparing server 7 has given a decision that the output as still image is optimum, the processing moves to step S53.

On the other hand, the information preparing server 7 checks whether or not the prepared musical number contents selection information had better be output by a moving picture for facility in selection of the musical number by the user, using an optimum outputting state check unit, not shown. If the information preparing server 7 has not given a decision that the output as a still image is optimum, the processing moves to step S53.

If, at step S54, the number of the musical numbers corresponding to the preparation information, the calculated value for which has exceeded the threshold value X is less than the constant N, and the information preparing server 7 has sent the musical number contents selection information to the client 2, the controller 2e causes less than N musical number contents selection information, received from the information preparing server 7 through the communication unit 2d and the controller 2e, to be demonstrated as moving picture on a liquid crystal display of the output unit 2b.

On the other hand, if the number of the musical numbers corresponding to the preparation information, the calculated value for which has exceeded the threshold value X, is not less than the constant number N, and the information preparing server 7 has sent the musical number contents selection information to the client 2, the controller 2e causes the N musical number contents selection information, received from the information preparing server 7 through the communication unit 2d, to be demonstrated as still image on e.g., a liquid crystal display of the output unit 2b in the sequence of the decreasing similarity to the genre speech information.

Then, if, at step S55, the number of the musical numbers, the calculated values for which have exceeded the threshold value X, is less than the constant N, and the information preparing server 7 sends the musical number contents selection information to the client 2, the controller 2e causes less than N pieces of the musical number contents selection information, received from the information preparing server 7 through the communication unit 2d, to be output as musical number as speech to e.g., a speaker of the output unit 2b.

On the other hand, if the number of the musical numbers, the calculated values for which have exceeded the threshold value X, is not less than the constant N, and the information preparing server 7 sends the musical number contents selection information to the client 2, the controller 2e causes the not less than N pieces of the musical number contents selection information, received from the information preparing server 7 through the communication unit 2d, to be output as speech at e.g., a speaker of the output unit 2b, in the sequence of the decreasing similarity to the genre speech information.

Then, at step S56, after the user hears the musical number contents selection information at the speaker, the controller 2e is fed from the input unit 2a with the speech information, input as speech by the user at the microphone of the input unit 2a. This speech information is the information pertinent to the musical number selected by the user from the list of the musical numbers as the musical number contents selection information.

Specifically, the speech information, which indicates the number allocated to the item of the list of the musical numbers as the music number contents selection information, is fed from the input unit 2a to the controller 2e.

The speech information, corresponding to the name of the musical number, as the music number contents selection information, input to the inputting unit 2a as speech, is fed from the input unit 2a to the controller 2e.

Moreover, if the output unit 2b is sequentially outputting the list of the musical numbers, as the music number contents selection information, by speech, and the user is desirous to select the musical number currently output by speech, the controller 2e is fed from the input unit 2a with the speech information, such as [this number] or [OK] input as speech at the input unit 2a. In this case, the input unit 2a may be constructed by a key input device or a jog dial.

If the output unit 2b is sequentially outputting plural portions of the musical number as the music number contents selection information, and the user is desirous to select the currently reproduced musical number, the controller 2e is fed from the input unit 2a with the speech information, such as [this number] or [OK] input as speech at the input unit 2a. The input unit 2a may again be constructed by a key input device or a jog dial.

If the client 2 at the outset has downloaded a list of the musical numbers, conforming to the user's liking, from the server system 3, the name of the musical number selected by the user from the list and which is input as speech to the input unit 2a is furnished from the input unit 2a to the controller 2e. The list of the musical numbers, conforming to the user's taste, may also be previously set by the user.

By the above-described operations, the musical number, which the user is desirous to be furnished from the server system 3, is selected from the list etc of the musical numbers as the music number contents selection information.

Then, at step S57, the selected speech information, input at the input unit 2a, is fed from the input unit 2a to the controller 2e. This speech information is referred to below as the selected speech information. The controller 2e sends the selected speech information, furnished from the input unit 2a, to the communication unit 2d, which then transmits the selected speech information as furnished to the speech recognition server 5 of the server system 3 through the base station 4.

The speech recognition server 5 then performs the speech recognition on the selected speech information received through the base station 4 from the communication unit 2d. The speech recognition server 5 sends the selected speech information, which is the result of speech recognition, to the client 2.

The controller 2e causes the recognized selected speech information, received from the speech recognition server 5 through the communication unit 2d, to be output as speech to e.g., the speaker of the output unit 2b. The user hears this recognized selected speech information from e.g., the speaker to confirm that the musical number he or she has selected has been correctly recognized by the server system 3.

Then, at step S58, the information purveying server 8 acquires the contents, such as music, to be transmitted to the client 2, from the contents information storage unit 9c, based on the recognized selected speech information furnished from the speech recognition server 5, to transmit the so-acquired contents to the client 2. The controller 2e causes the speaker of the output unit 2b to reproduce the contents, such as music, received from the information purveying server 8 through the communication unit 2d.

Then, at step S59, the reproduction of the contents from the output unit 2b comes to a close. If the user continues to utilize the MOD service, the processing reverts to step S3.

On the other hand, if the user has input the service end request information for terminating the use of the MOD service by speech with e.g., the microphone of the input unit 2a, the controller 2e is fed from the input unit 2a with the service end request speech information input to the input unit 2a. The controller 2e furnishes the service end request speech information, supplied from the input unit 2a, to the communication unit 2d. The communication unit 2d transmits the service end request speech information through the base station 4 to the speech recognition server 5 of the server system 3.

The speech recognition server 5 performs speech recognition on the service end request speech information, received through the base station 4 from the communication unit 2d, by an acoustic analyzer, an acoustic model and on a language model, not shown. The speech recognition server 5 then furnishes the service end request speech information to the information preparing server 7.

When fed with the service end request speech information from the speech recognition server 5, the information preparing server 7 sends the service end permission information as speech to the client 2.

The controller 2e causes the service end permission information, received from the information preparing server 7 through the communication unit 2d, to be output as speech at e.g., a speaker of the controller 2e.

The user hears the service end permission information as speech from the speaker etc to recognize the end of the MOD service.

By the above processing, in which the server system 3 verifies which list of the musical numbers as the musical number contents selection information output next enables the user to readily select the targeted musical number. So, the user is able to select the targeted musical number more readily and more quickly from the list of the musical number contents selection information.

In the contents selection system 1, as the first embodiment of the present invention, the user is able to select the targeted musical number readily from the list of the musical numbers output at the output unit 2b by inputting the speech information at a microphone of the input unit 2a. Therefore, the user employing the client 2 or the server system 3 provided with the speech recognition device is able to utilize the MOD service by a simplified operation.

In the above-described contents selection system 1, the network is constructed using the IMT-2000. However, networks of other communication systems can also be used. Although only one client 2 is shown in FIG. 1, plural clients 2 are in effect connected through the IMT-2000 to the server system 3. Moreover, the above-described speech recognizing function, provided on the speech recognition server 5, may be provided on the client 2.

INDUSTRIAL APPLICABILITY

In the above-described contents selection system, contents selection client, contents selection server and the contents selection method, the operator is able to input the speech information to the input information transmission means of the client to select the targeted contents more promptly and readily from the contents output to the output means.

The invention claimed is:

1. A contents selection system for selecting content items, each content item corresponding to a first preparation information within a first category, a second preparation information within a second category, and a third preparation information within a third category, the system comprising:
   a portable terminal configured to transmit input speech information to a server over a network; and
   a server configured to receive the transmitted input speech information from the portable terminal, and to generate a contents list,
   wherein the server generates a first contents list by calculating the similarity of acoustic characteristic quantities between first input speech information and the first preparation information for the content items;
   wherein the server selects the second category or the third category based upon which category will better narrow the first contents list by comparing acoustical variations between preparation information within the second category with acoustical variations between preparation information within the third category, and selecting the category with greater acoustical variations;
   wherein the server transmits input request information related to the selected second or the third category to the portable terminal; and
   wherein the server narrows the first content list by calculating the similarity of acoustic characteristic quantities between second input speech information and the second preparation information or the third preparation information for the content items.

2. The contents selection system according to claim 1 wherein:
   said portable terminal includes speech recognition means for performing speech recognition on said input speech information.

3. The contents selection system according to claim 2 wherein:
   said speech recognition means includes means for verifying whether or not the speech recognition on said input speech information has been made correctly, such that
   if the speech recognition is verified by said verification means to be made correctly, then said input speech information, processed with said speech recognition means, is output, and
   if the speech recognition is verified by said verification means not to be made correctly, then speech recognition is performed again to output the input speech information processed with said speech recognition means.

4. The contents selection system according to claim 1 wherein:
   said server includes speech recognition means for performing speech recognition on said input speech information received from said portable terminal over the network.

5. The contents selection system according to claim 4 wherein:
   said speech recognition means includes means for verifying whether or not the speech recognition on said input speech information has been made correctly, such that
   if the speech recognition is verified by said verification means to be made correctly, then said input speech information, processed with said speech recognition means, is output, and
   if the speech recognition is verified by said verification means not to be made correctly, then speech recognition is performed again on the input speech information received over the network from said portable terminal to output the input speech information processed with said speech recognition means.

6. The contents selection system according to claim 1, wherein the categories include title, performer, and genre.

7. The contents selection system according to claim 1, wherein said server sends the contents list to said portable terminal if the contents list is determined using threshold value.

8. The contents selection system according to claim 1, wherein said server requests the input speech information associated with a specified category.

9. The contents selection system according to claim 8, wherein the first input speech information requested by said server to a user is title information.

10. The contents selection system according to claim 1, further comprising an optimum output state checking unit, for determining whether information pertinent to contents items in the first contents list is preferably output at the portable terminal as text, a still image, a moving picture, or speech.

11. A portable terminal for a contents selection system, the portable terminal comprising:
   a transmitter to transmit input speech information to a server over a network; and
   a receiver to receive a contents list corresponding to content items, the contents list generated by the server;
   wherein each content item corresponds to a first preparation information within a first category, a second preparation information within a second category, and a third preparation information within a third category; and
   wherein a first contents list is generated by calculating the similarity of acoustic characteristic quantities between the input speech information and the first preparation information for the content items;

wherein the second category or the third category is selected based upon which category will better narrow the first contents list by comparing acoustical variations between preparation information within the second category with acoustical variations between preparation information within the third category, and selecting the category with greater acoustical variations;

wherein the receiver receives input request information related to the selected second or third category; and wherein the receiver receives a second contents list narrower than the first contents list and calculated by determining the similarity of acoustic characteristic quantities between second input speech information and the second preparation information or the third preparation information for the content items.

12. The client for a contents selection system according to claim 11, further comprising:

speech recognition means for performing speech recognition on the input speech information, and transmitting the recognized input speech information to the server.

13. A server for a contents selection system, the server comprising:

a receiver to receive input speech information from a portable terminal over a network; and a transmitter to transmit a contents list corresponding to content items, the contents list generated by the server;

wherein each content item corresponds to a first preparation information within a first category, a second preparation information within a second category, and a third preparation information within a third category;

wherein the server generates a first contents list by calculating the similarity of acoustic characteristic quantities between first input speech information and the first preparation information for the content items;

wherein the server selects the second category or the third category based upon which category will better narrow the first contents list by comparing acoustical variations between preparation information within the second category with acoustical variations between preparation information within the third category, and selecting the category with greater acoustical variations;

wherein the server transmits input request information related to the second or third category to the portable terminal; and wherein the server narrows the first content list by calculating similarity of acoustic characteristic quantities between second input speech information and the second preparation information or third preparation information for the content items.

14. The server for a contents selection system according to claim 13, further comprising:

speech recognition means for performing speech recognition on said input speech information received from said portable terminal over said network.

15. The server for a contents selection system according to claim 13, wherein said server sends the contents list to said portable terminal if the contents list is determined using threshold value.

16. The server for a contents selection system according to claim 13, wherein said server requests the input speech information associated with a specified category.

17. The server for a contents selection system according to claim 16, wherein the first input speech information requested by said server to a user is title information.

18. A contents selection method, comprising:

transmitting input speech information from a portable terminal to a server over a network; and generating a contents list corresponding to contents items, the contents list generated at the server;

wherein each content item corresponds to a first preparation information within a first category, a second preparation information within a second category, and a third preparation information within a third category;

wherein the server generates a first contents list by calculating the similarity of acoustic characteristic quantities between first input speech information and the first preparation information for the content items;

wherein the server selects the second category or the third category based upon which category will better narrow the first contents list by comparing acoustical variations between preparation information within the second category with acoustical variations between preparation information within the third category, and selecting the category with greater acoustical variations;

wherein the server transmits input request information related to the selected second or third category to the portable terminal; and wherein the server narrows the first content list by calculating similarity of acoustic characteristic quantities between second input speech information and the second preparation information or third preparation information for the content items.

19. The contents selection method according to claim 18, wherein the categories include title, performer, and genre.

* * * * *